A. M. White,
Nozzle,
N° 63,680,    Patented Apr. 9, 1[867]
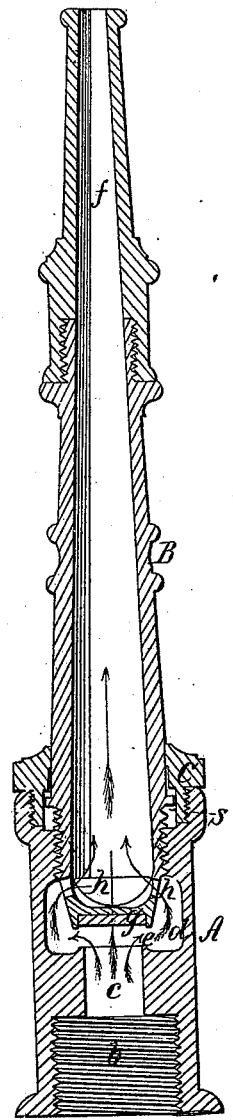
Witnesses:
L. Holms Jr
J. M. Connly
Inven[tor]
A. M. [White]

United States Patent Office.

ALBERT M. WHITE, OF NEW YORK,

Letters Patent No. 63,680, dated April 9, 1867.

IMPROVEMENT IN NOZZLES FOR HOSE PIPES.

The Schedule referred to in these Letters Patent and making part of the

TO ALL WHOM IT MAY CONCERN:

Be it known that I, ALBERT M. WHITE, of the city, county, and State of New certain new and useful improvement on Hose-Pipe Nozzles, of which the following is description, reference being had to the accompanying drawing, forming part of this sp sents a longitudinal section of a hose pipe constructed according to my improvement.

The nature of my invention consists in a hose pipe so constructed as that on turn held by the hand, and which is of peculiar valvular construction for operation in conr in the socket, the discharge of water is shut off or opened and amount or capacity reg same manner as by a compression-cock, without the intervention of a separate cock for Referring to the accompanying drawing, A represents the socket portion of the h inner end with a female screw, $b$, for attachment to a length of hose or pipe, intermediate furnished with a valve seat, $e$. Into the outer end of the socket A is screwed the pipe outer end with a detachable discharge attachment or pipe, $f$, forming part of the pipe B, and replaced by others of different bores to suit various sizes of stream. The inner valvular construction, as shown at $o$, for, by screwing inwards or outwards said pipe, c down on the valve seat $e$, so as to close the passage $e$, or to more or less open said pas the flow of water into the chamber $d$, from whence it passes through openings $h$ into having a stuffing-box character, is arranged to screw into the outer end of the socke forms a stuffing-box and guide to the pipe B, but may also be used as a stop to said pip detached, excepting when necessary, and to limit the extent of its play by a projectio in contact with the under portion of the head of the nut, on the pipe being unscrev opened to its full extent. A hose pipe thus constructed requires no separate cock attac off, open, or regulate the discharge, which operations may be effected with the greates by simply turning to the right or left the pipe B; the same hand that is required to pipe answering, by twisting or turning it, to regulate the discharge.

What I claim as my invention, and desire to secure by Letters Patent, is—

The combination of the socket A, pipe B, and collar C, with the valve $g$, and val arranged, and operating substantially as herein shown and described.

Witnesses:
  J. W. COOMBS,
  G. W. REED.